United States Patent
Sakhare et al.

(10) Patent No.: US 11,718,283 B2
(45) Date of Patent: Aug. 8, 2023

(54) BRAKE ASSEMBLY HAVING A SENSOR

(71) Applicant: ArvinMeritor Technology, LLC, Troy, MI (US)

(72) Inventors: Sukrut Sakhare, Goodrich, MI (US); Daniel Philpott, Goodrich, MI (US); Alexander Adkins, Troy, MI (US); Christopher Polmear, Southfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 509 days.

(21) Appl. No.: 17/025,413

(22) Filed: Sep. 18, 2020

(65) Prior Publication Data

US 2022/0089139 A1 Mar. 24, 2022

(51) Int. Cl.
| | |
|---|---|
| *F16D 65/54* | (2006.01) |
| *B60T 17/22* | (2006.01) |
| *B60T 1/06* | (2006.01) |
| *F16D 55/226* | (2006.01) |
| *F16D 65/56* | (2006.01) |
| *F16D 66/00* | (2006.01) |

(52) U.S. Cl.
CPC ............ *B60T 17/221* (2013.01); *B60T 1/065* (2013.01); *F16D 55/226* (2013.01); *F16D 65/567* (2013.01); *F16D 66/00* (2013.01); *F16D 2066/006* (2013.01)

(58) Field of Classification Search
CPC ...... B60T 1/065; B60T 17/221; F16D 55/226; F16D 65/567; F16D 66/021; F16D 66/026; F16D 66/027
See application file for complete search history.

(56) References Cited

U.S. PATENT DOCUMENTS

| | | |
|---|---|---|
| 4,491,203 A | 1/1985 | Monick |
| 4,620,617 A | 11/1986 | Weber |
| 4,690,253 A | 9/1987 | Weber |
| 4,958,654 A | 9/1990 | Hoffman, Jr. et al. |
| 6,276,494 B1 | 8/2001 | Ward et al. |
| 6,354,407 B1 | 3/2002 | Heinlein et al. |
| 6,607,059 B1 | 8/2003 | Kapaan et al. |
| 6,659,236 B1 | 12/2003 | Clark et al. |
| 6,691,837 B1 | 2/2004 | Kapaan et al. |
| 9,599,177 B2 | 3/2017 | Yasui et al. |
| 10,876,586 B2 * | 12/2020 | Jungmann ............. F16D 66/025 |

(Continued)

FOREIGN PATENT DOCUMENTS

| | | |
|---|---|---|
| DE | 10 2006 020550 A1 | 1/2008 |
| DE | 102008037774 B3 | 2/2010 |

(Continued)

OTHER PUBLICATIONS

Extended European search report dated Feb. 15, 2022 for related European Application No. 21196962.1; 9 pgs.

*Primary Examiner* — Nicholas J Lane
(74) *Attorney, Agent, or Firm* — Brooks Kushman PC (57) ABSTRACT

A brake assembly having a sensor assembly that is received inside a shaft of a wear adjuster mechanism. The wear adjuster mechanism may be at least partially received inside a piston that may be rotatable about the axis and may be at least partially received in a tappet. The sensor may provide a signal that is indicative of rotation of the shaft.

20 Claims, 10 Drawing Sheets

(56) References Cited

U.S. PATENT DOCUMENTS

| | | | |
|---|---|---|---|
| 11,536,330 B2* | 12/2022 | Taylor | F16D 55/227 |
| 11,608,045 B2* | 3/2023 | Philpott | F16D 65/0025 |
| 2002/0112927 A1* | 8/2002 | Giering | F16D 65/183 |
| | | | 188/71.8 |
| 2003/0085082 A1 | 5/2003 | Severinsson et al. | |
| 2003/0173164 A1 | 9/2003 | Angerfors | |
| 2005/0121265 A1* | 6/2005 | Deckhut | F16D 65/18 |
| | | | 188/1.11 W |
| 2005/0284709 A1 | 12/2005 | Sandberg | |
| 2007/0256901 A1* | 11/2007 | Niehorster | F16D 66/025 |
| | | | 188/71.7 |
| 2010/0230219 A1* | 9/2010 | Helf | F16D 66/026 |
| | | | 188/71.8 |
| 2012/0325596 A1 | 12/2012 | Malki et al. | |
| 2013/0008749 A1* | 1/2013 | Sandberg | F16D 65/18 |
| | | | 29/446 |
| 2013/0256076 A1 | 10/2013 | Malki et al. | |
| 2015/0354645 A1 | 12/2015 | Cann | |
| 2016/0160949 A1* | 6/2016 | Philpott | F16D 65/568 |
| | | | 188/71.9 |
| 2019/0024740 A1 | 1/2019 | Taylor et al. | |
| 2019/0024742 A1* | 1/2019 | Taylor | F16D 65/0025 |
| 2019/0063530 A1 | 2/2019 | Kulkarni et al. | |
| 2019/0331181 A1 | 10/2019 | Kulkarni et al. | |
| 2019/0331184 A1 | 10/2019 | Taylor et al. | |
| 2019/0331185 A1 | 10/2019 | Shah et al. | |
| 2022/0349451 A1* | 11/2022 | Kramer | B60T 17/22 |

FOREIGN PATENT DOCUMENTS

| | | |
|---|---|---|
| DE | 10 2015 013199 A1 | 4/2017 |
| EP | 0190453 A2 | 8/1986 |
| EP | 2 682 635 A2 | 1/2014 |
| GB | 2474301 A | 4/2011 |

\* cited by examiner

BRAKE ASSEMBLY HAVING A SENSOR

TECHNICAL FIELD

This document relates to a brake assembly having a sensor that may be received in a shaft of a wear adjuster mechanism.

BACKGROUND

A brake assembly is disclosed in U.S. Patent Publication No. 2019/0024740.

SUMMARY

In at least one embodiment a brake assembly is provided. The brake assembly may include a brake caliper, a tappet, a piston, a wear adjuster mechanism, and a sensor assembly. The tappet may be moveable along an axis with respect to the brake caliper and may be adapted to engage a brake pad assembly. The piston may be rotatable about the axis and may be at least partially received in the tappet. The piston and tappet may have mating threads. The wear adjuster mechanism may be at least partially received inside the piston and may include a shaft that is rotatable about the axis. The sensor assembly may be received inside the shaft and may provide a signal indicative of rotation of the shaft.

In at least one embodiment a brake assembly is provided. The brake assembly may include a brake caliper, a tappet, a piston, a wear adjuster mechanism, a sensor assembly, and a controller. The tappet may be moveable along an axis with respect to the brake caliper and may engage a brake pad assembly. The piston may be moveable along the axis, may be rotatable about the axis, and may be at least partially received in the tappet. The piston and tappet may have mating threads. The wear adjuster mechanism may be at least partially received inside the piston and may include a shaft. The shaft may define a shaft cavity and may be rotatable about the axis. The sensor assembly may be received inside the shaft cavity and may provide a signal indicative of rotation of the shaft. The controller may receive the signal and may provide an output based on the signal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
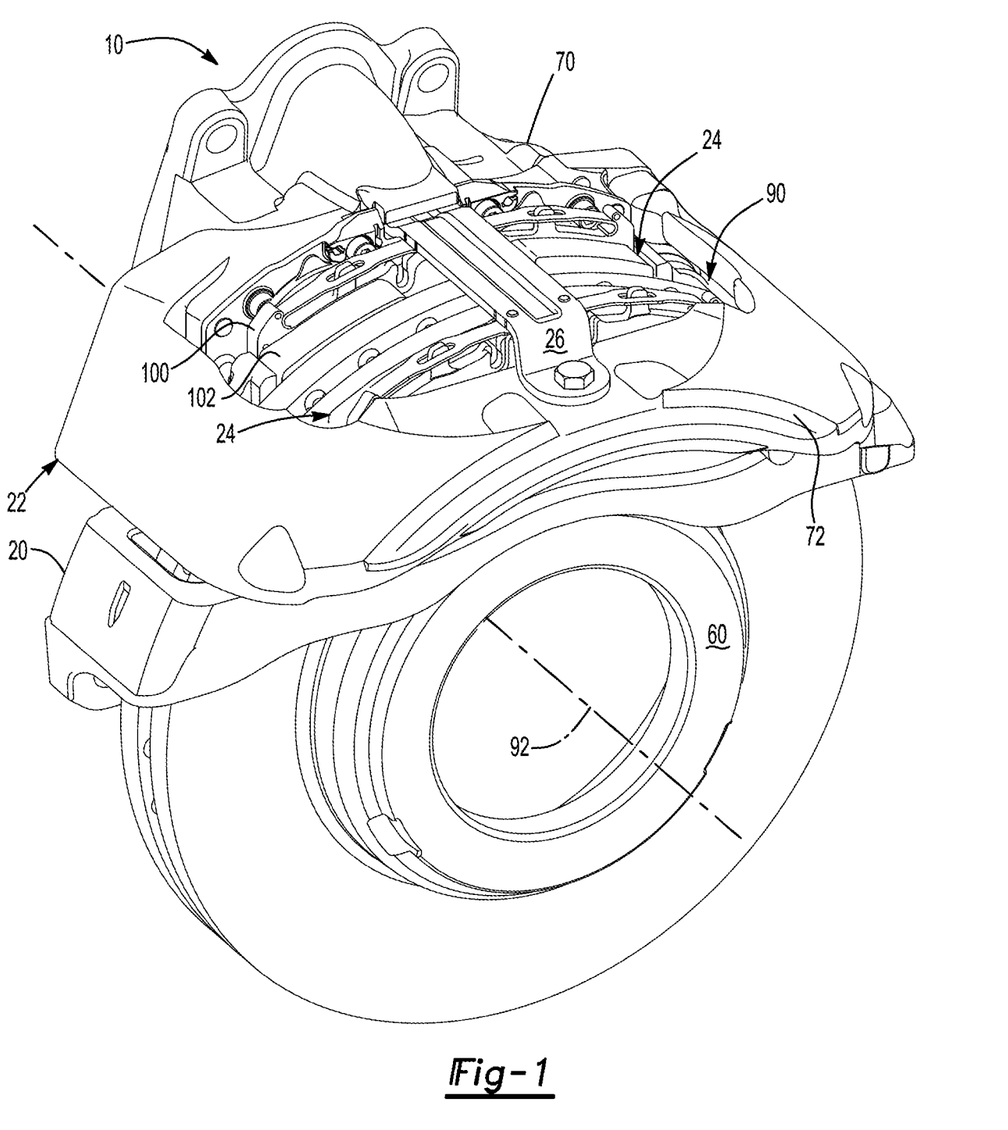
FIG. 1 is a perspective view of an example of a brake assembly.
Figure 4:
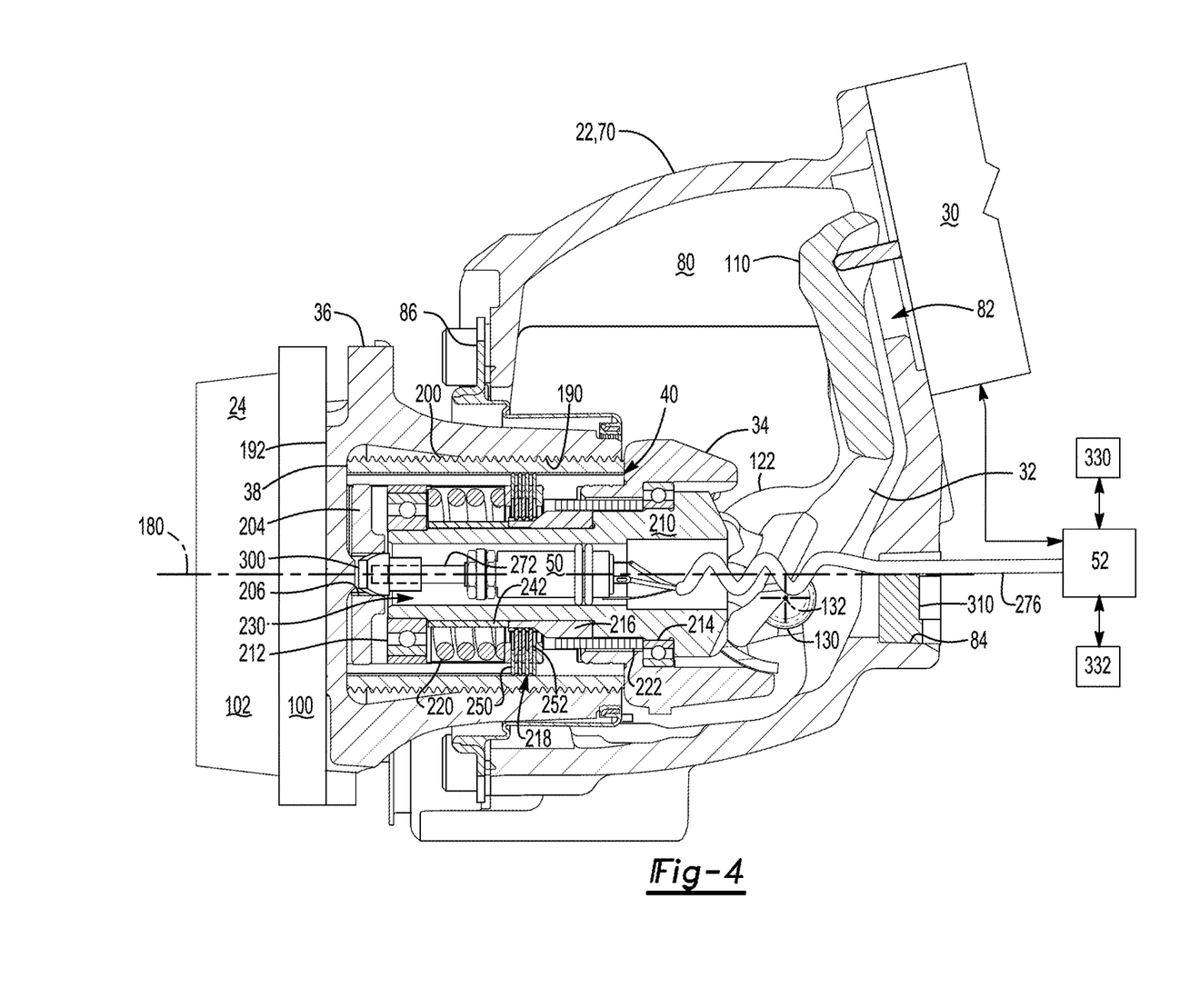
FIG. 4 is a section view of a portion of the brake assembly along section line 4-4 showing a tappet in a first position.
Figure 6:
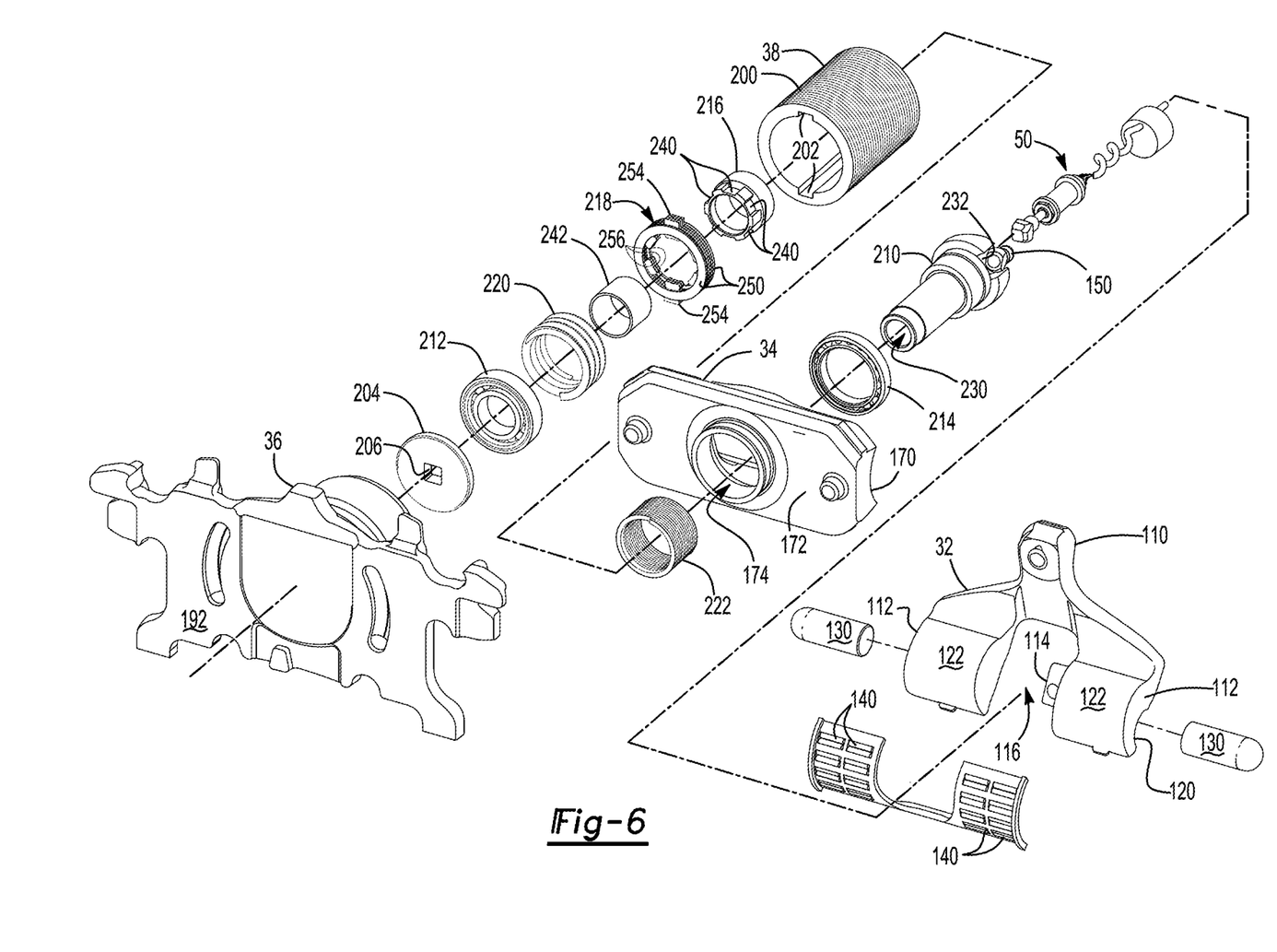
FIGS. 6 and 7 are exploded views of a portion of the brake assembly.

Referring to FIG. 1, an example of a brake assembly 10 is shown. The brake assembly 10 may be provided as part of a vehicle, such as a motor vehicle like a truck, bus, farm equipment, military transport or weaponry vehicle, or cargo loading equipment for land, air, or marine vessels. The brake assembly 10 may be configured as a disc brake. In at least one configuration, the brake assembly 10 may include a brake carrier 20, a brake caliper 22, a pair of brake pad assemblies 24, and optionally a retainer bracket 26. Referring primarily to FIGS. 4 and 6, the brake assembly 10 may include components that may facilitate movement of the brake pad assemblies 24, such as a brake actuator 30, an operating shaft 32, a yoke 34, a tappet 36, a piston 38, a wear adjuster mechanism 40, and at least one retraction spring 42. In addition, the brake assembly 10 may include a sensor assembly 50 that may be in communication with a controller 52. The brake assembly 10 will primarily be described below with a configuration that has one tappet and piston; however, it is contemplated that the brake assembly 10 may be provided with multiple tappets and/or pistons. Multiple sensor assemblies 50 need not be provided in a multi-piston or multi-tappet configuration.

Referring to FIG. 1, the brake carrier 20 may be fixedly mounted to the vehicle. For example, the brake carrier 20 may be directly or indirectly mounted to an axle assembly or a steering knuckle. The brake carrier 20 may receive and support the brake pad assemblies 24 in a manner that permits the brake pad assemblies 24 to move along an axis toward and away from the brake rotor 60 while inhibiting rotation of the brake pad assemblies 24 about the axis. The brake carrier 20 may include a rotor opening that may receive a brake rotor 60. As such, the brake carrier 20 may straddle the brake rotor 60 and help position the brake pad assemblies 24 on opposite sides of the brake rotor 60.

Figure 2:
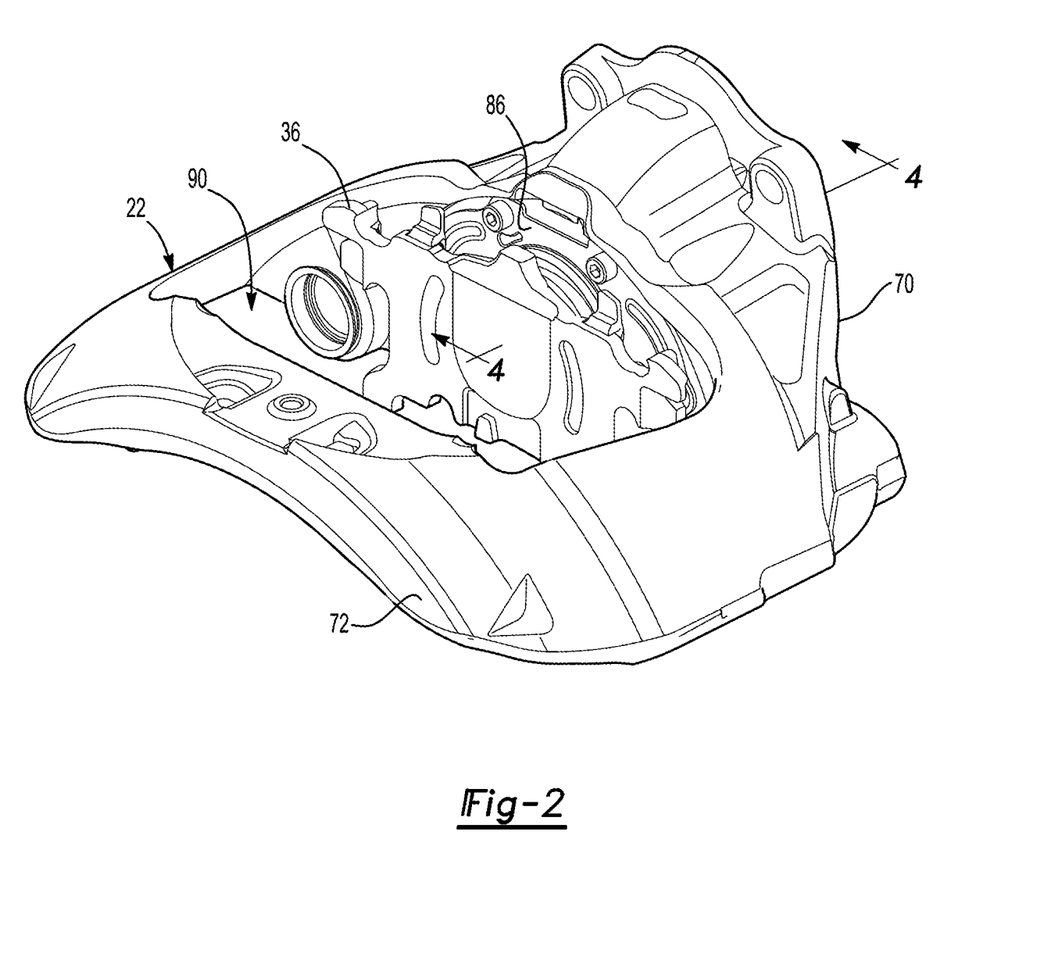
FIG. 2 is a perspective view of a portion of the brake assembly with components such as a brake carrier and brake pad assemblies omitted for clarity.

Referring to FIGS. 1 and 2, the brake caliper 22 may receive various components of the brake assembly 10. In addition, the brake caliper 22 may facilitate positioning of the brake pad assemblies 24 with respect to the brake rotor 60 to facilitate braking of the vehicle. In at least one configuration, the brake caliper 22 may be mounted to the brake carrier 20 and may include a caliper housing 70 and a caliper bridge 72.

The caliper housing 70 may be moveably disposed on the brake carrier 20. For example, the caliper housing 70 may be slidably disposed on a pair of guide pins that may be fixedly disposed on the brake carrier 20. As is best shown in FIG. 4, the caliper housing 70 may facilitate mounting of the brake actuator 30 and may define a cavity 80, an opening 82, and a hole 84.

The cavity 80 may receive or partially receive various components that facilitate movement of the brake pad assemblies 24, such as the operating shaft 32, yoke 34, tappet 36, piston 38, wear adjuster mechanism 40 and retraction springs 42. The cavity 80 may have an aperture that may face toward the brake rotor 60 and that may be at least partially enclosed by a cover plate 86 that may be fixedly mounted to the caliper housing 70, such as with fasteners like bolts.

The opening 82 may extend from the cavity 80 through a back side of the caliper housing 70 that may face away from the brake rotor 60. In at least one configuration, a shaft of the brake actuator 30 may extend through the opening 82 to facilitate actuation of the operating shaft 32. The opening 82 may be disposed above an axis 180.

The hole 84 may extend from the cavity 80 through the back side of the caliper housing 70. The hole 84 may be spaced apart from the opening 82. A cable of the sensor assembly 50 may extend through the hole 84. The hole 84 may be sized such that the sensor assembly 50 may be insertable and removeable through the hole 84 without disassembly of various components of the brake assembly 10 that facilitate movement of the brake pad assemblies 24, such as the wear adjuster mechanism 40. The hole 84 may be disposed below the axis 180.

Referring to FIGS. 1 and 2, the caliper bridge 72 may be integrally formed with or may be fixedly disposed on the caliper housing 70. For example, the caliper bridge 72 may be coupled to the caliper housing 70 with one or more fasteners, such as bolts. In at least one configuration, the caliper bridge 72 may cooperate with the caliper housing 70 to at least partially define an opening 90 that may facilitate insertion and removal of the brake pad assemblies 24.

Referring to FIG. 1, a pair of brake pad assemblies 24 may be received in and may be supported by the brake carrier 20. The brake pad assemblies 24 may be disposed on opposite sides of the brake rotor 60 and may be engageable with the brake rotor 60 to slow rotation of the brake rotor 60 and an associated wheel about a brake rotor axis of rotation 92. One brake pad assembly 24 may be positioned between the caliper housing 70 and the brake rotor 60 and may be referred to as an inboard brake pad assembly 24. The brake pad assembly 24 located on the opposite side of the brake rotor 60 may be positioned between the caliper bridge 72 and the brake rotor 60 and may be referred to as an outboard brake pad assembly 24. The brake pad assemblies 24 may include a backplate 100 and friction material 102.

The backplate 100 may be a structural member of a brake pad assembly 24. The backplate 100 may be configured as a generally flat plate and may be made of any suitable material, such as metal or a metal alloy. As is best shown in FIG. 4, a side of the backplate 100 that faces away from the friction material 102 may engage or contact the tappet 36.

The friction material 102 may be disposed on a side of the backplate 100 that may face toward the brake rotor 60. The friction material 102 may contact the brake rotor 60 during vehicle braking.

Referring to FIG. 1, the retainer bracket 26 may be removably mounted to the brake caliper 22. For example, the retainer bracket 26 may extend across the brake pad assemblies 24 and the opening 90 in the brake caliper 22 to help retain the brake pad assemblies 24 in the brake carrier 20 when the retainer bracket 26 is secured to the brake caliper 22. Conversely, the retainer bracket 26 may be detached from or removed from the brake caliper 22 to permit removal of the brake pad assemblies 24 or installation of the brake pad assemblies 24 via the opening 90.

Referring to FIG. 4, the brake actuator 30 may be mounted to the brake caliper 22. In at least one configuration, the brake actuator 30 may be mounted to the back side of the caliper housing 70 and may have a brake actuator shaft that may extend through the opening 82 in the caliper housing 70. The brake actuator shaft may engage the operating shaft 32 and may be moveable to rotate the operating shaft 32.

Figure 7:
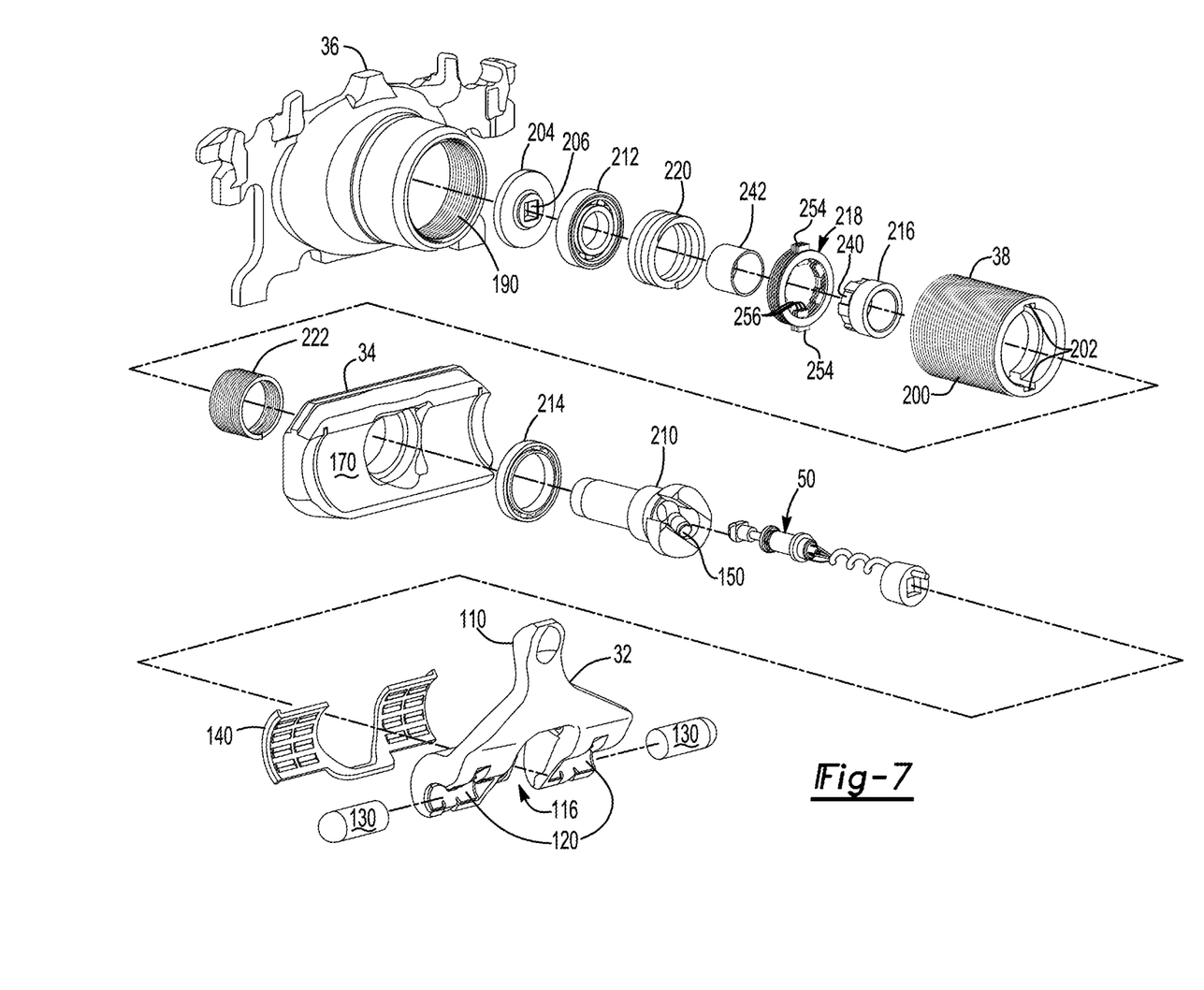

Referring to FIGS. 4, 6 and 7, the operating shaft 32 may transmit force from the brake actuator 30 other moveable components of the brake assembly 10. In at least one configuration, the operating shaft 32 may generally be configured as an inverted "Y" and may include a lever 110, a pair of cams 112, and a tab 114.

Referring to FIG. 4, the lever 110 may extend from the cams 112 toward the opening 82. The lever 110 may have a pocket that may receive an end of the brake actuator shaft.

Referring to FIGS. 6 and 7, the cams 112 may be spaced apart from each other such that a gap 116 is provided between the cams 112. In at least one configuration, the cams 112 may have mirror symmetry with respect to each other. In at least one configuration, a cam 112 may include a concave recess 120 and a convex surface 122.

The concave recess 120 may receive a corresponding roller 130. The roller 130 may be supported by a corresponding arcuate surface in the cavity 80 of the caliper housing 70 and may be rotatable about a roller axis of rotation 132, which is best shown in FIG. 3.

The convex surface 122 may be disposed opposite the concave recess 120. The convex surface 122 may engage a corresponding set of roller bearings 140 that may be disposed between the convex surface 122 and the yoke 34. The rollers 130 and roller bearings 140 may facilitate rotation of the operating shaft 32 about an axis of rotation.

Figure 3:
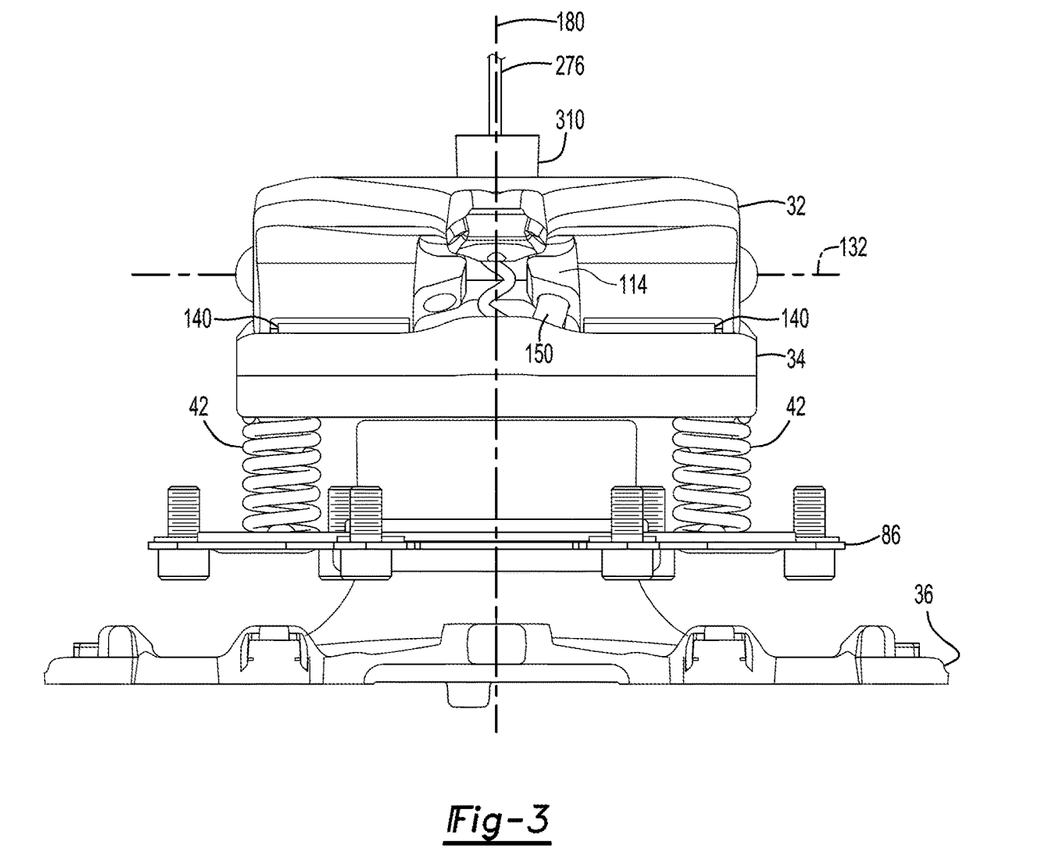
FIG. 3 is a top view of a portion of FIG. 2 with the brake caliper omitted for clarity.

Referring to FIG. 3, a tab 114 may extend from at least one of the cams 112 into the gap 116. A ball pin 150 may be fixedly mounted to the tab 114 and may extend toward the wear adjuster mechanism 40 as will be discussed in more detail below. In at least one configuration, the ball pin 150 may have a generally spherical or rounded ball at its distal end.

Figure 5:
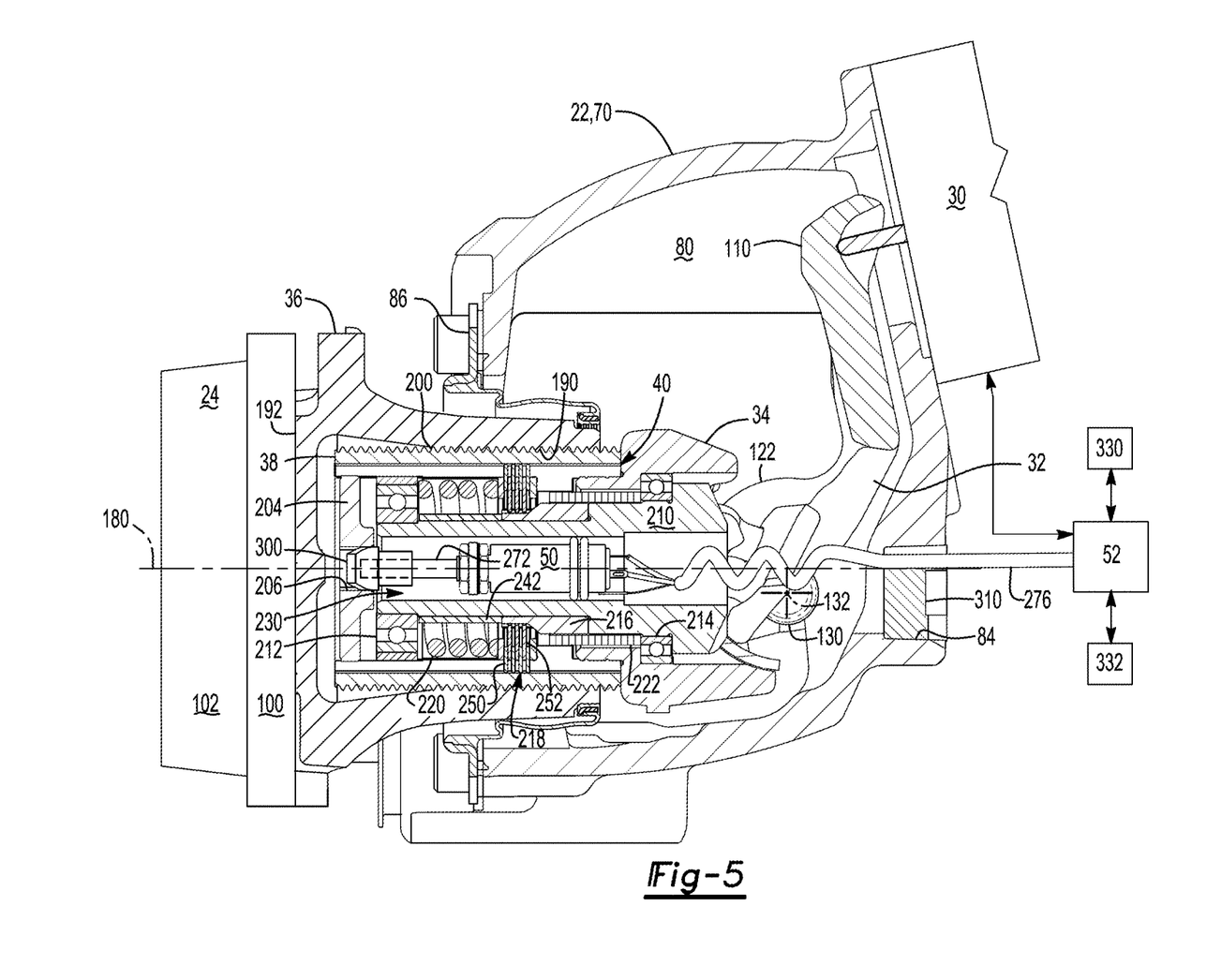
FIG. 5 is a section view showing the tappet in a second position.

Referring to FIGS. 4, 5 and 7, the yoke 34 may be disposed between the operating shaft 32 and the piston 38. In at least one configuration, the yoke 34 may include a concave surface 170, an engagement surface 172, and a through hole 174.

The concave surface 170 may face toward the operating shaft 32 and may engage the roller bearings 140.

The engagement surface 172 may be disposed opposite the concave surface 170. The engagement surface 172 may engage or contact an end of the piston 38.

The through hole 174 may be disposed proximate the center of the yoke 34 and may extend around an axis 180. The through hole 174 may receive at least a portion of the wear adjuster mechanism 40. The axis 180 may be offset from and may extend substantially parallel to the brake rotor axis of rotation 92.

Referring to FIGS. 4, 6 and 7, the tappet 36 may be moveable along the axis 180 with respect to the caliper housing 70. However, the brake carrier 20 may inhibit or prevent the tappet 36 from rotating about the axis 180. The tappet 36 may protrude away from the cavity 80 of the caliper housing 70 and may have a generally hollow body that may include an inner female thread 190 and an engagement face 192.

The inner female thread 190 may face toward the axis 180 and may extend around the axis 180.

The engagement face 192 may face away from the cavity 80. The engagement face 192 may engage or contact a brake pad assembly 24. For example, the engagement face 192 may engage or contact a side of the backplate 100 that may be disposed opposite the friction material 102.

Referring to FIGS. 4, 6 and 7, the piston 38 may be at least partially received inside the tappet 36. The piston 38 may be moveable along the axis 180. In addition, the piston 38 may be rotatable about the axis 180. In at least one configuration, the piston 38 may have a hollow tubular configuration that may include an outer female thread 200, at least one recess 202, and an end cap 204. The brake assembly 10 may be provided with a single piston 38 in one or more configurations.

The outer female thread 200 may face away from the axis 180 and may extend around the axis 180. The outer female thread 200 may mate with the inner female thread 190 of the tappet 36. As such, the tappet 36 and the piston 38 may have mating threads.

Referring to FIGS. 6 and 7, at least one recess 202 may be provided in an inner surface of the piston 38 that may be disposed opposite the outer female thread 200 and that may face toward the axis 180. In the configuration shown, two recesses 202 are provided that are disposed opposite each other and extend the length of the piston 38. The recesses 202 may facilitate mounting of a disc pack of the wear adjuster mechanism 40 as will be discussed in more detail below.

Referring to FIGS. 4, 6 and 7, the end cap 204 may be disposed at an end of the piston 38 that may face toward the brake pad assembly 24 and the tappet 36. The end cap 204 may be integrally formed with the body of the piston 38 or may be provided as a separate component. In the configuration shown, the end cap 204 is provided as a separate component that may be received in the hollow body of the piston 38. The end cap 204 may be fixed to the piston 38 such that the piston 38 is not rotatable with respect to the end cap 204. In at least one configuration, the end cap 204 may include an end cap hole 206. The axis 180 may extend through the end cap hole 206.

Referring to FIG. 4, the wear adjuster mechanism 40 may be configured to maintain a desired running clearance between the brake pad assemblies 24 and the brake rotor 60 when the brake pad assemblies 24 are retracted. As an overview, the wear adjuster mechanism 40 may include a one-way clutch that may permit the axial position of a brake pad assembly along the axis 180 to be adjusted or move closer to the brake rotor 60 in response to wear of the friction material 102. The wear adjuster mechanism 40 may be provided in various configurations, some examples of which are disclosed in United States Patent Publication No. 2019/0024740, which is hereby incorporated by reference in its entirety. The wear adjuster mechanism 40 may be at least partially received inside the piston 38. In at least one configuration and as is best shown with reference to FIGS. 4, 6 and 7, the wear adjuster mechanism 40 may include a shaft 210, a first bearing assembly 212, a second bearing assembly 214, a drum 216, a disc pack 218, a first biasing member 220, and a second biasing member 222.

The shaft 210 may be at least partially received in the cavity 80 of the caliper housing 70. The shaft 210 may be disposed in the through hole 174 of the yoke 34 and inside the hole or cavity of the piston 38. In addition, the shaft 210 may be spaced apart from the yoke 34 and the piston 38. The shaft 210 may be rotatable about the axis 180 and may define a shaft cavity 230 and a ball pin engagement feature 232.

The shaft cavity 230 may extend along the axis 180. In at least one configuration, the shaft cavity 230 may be configured as a through hole that may extend along the axis 180 from a first end of the shaft 210 to a second end of the shaft 210 that may be disposed opposite the first end of the shaft 210. A portion of the shaft cavity 230 that may be received inside the yoke 34 may have a larger diameter than a portion of the shaft cavity 230 that may be received inside the piston 38 to help facilitate insertion and removal of the sensor assembly 50.

Referring primarily to FIG. 6, the ball pin engagement feature 232 may be configured to engage the ball pin 150. The ball pin engagement feature 232 may be disposed at an end of the shaft 210 that may face toward the operating shaft 32 and may be offset from the axis 180. In the configuration shown, the ball pin engagement feature 232 is configured as a recess that may receive the ball pin 150. The ball pin 150 may extend at an angle with respect to the axis 180 such that rotation of the operating shaft 32 may cause the ball pin 150 to engage a side or surface of the ball pin engagement feature 232 in a manner that may rotate the shaft 210 about the axis 180. It is also contemplated that the ball pin engagement feature 232 may have a male configuration and the ball pin 150 may have a female configuration in other configurations.

Referring to FIGS. 4, 6 and 7, the first bearing assembly 212 may rotatably support the shaft 210. The first bearing assembly 212 may be disposed proximate a first end of the shaft 210 and may receive the shaft 210. For instance, the first bearing assembly 212 may extend around the shaft 210 and may be received inside the piston 38. As such, the first bearing assembly 212 may extend from the shaft 210 to or toward the inner surface of the piston 38.

The second bearing assembly 214 may rotatably support the shaft 210. The second bearing assembly 214 may be disposed proximate a second end of the shaft 210 and may receive the shaft 210. For instance, the second bearing assembly 214 may extend around the shaft 210 and may be received inside the through hole 174 of the yoke 34. As such, the second bearing assembly 214 may extend from the shaft 210 to or toward the yoke 34.

The drum 216 may be received inside the piston 38 and may be spaced apart from the piston 38. The drum 216 may extend around and may receive a portion of the shaft 210. In addition, the shaft 210 may be selectively rotatable about the axis 180 with respect to the drum 216 as will be discussed in more detail below. In at least one configuration, the drum 216 may have a hollow tubular construction that may include at least one recess 240. As is best shown in FIG. 6, a plurality of recesses 240 are arranged around an exterior side of the drum 216 that faces away from the axis 180. The recesses 240 may extend from an end of the drum 216 that may face toward the tappet 36 toward an opposite end of the drum 216. The recesses 240 may facilitate mounting of the disc pack 218. As is best shown in FIG. 4, axial movement of the drum 216 may be constrained by the shaft 210 and by a spacer 242 that may extend from an end of the drum 216 to the first bearing assembly 212.

Referring to FIGS. 4, 6 and 7, the disc pack 218 may selectively couple the piston 38 and the drum 216. The disc pack 218 may include a plurality of discs that may include at least one outer disc 250 and at least one inner disc 252. As is best shown in FIGS. 6 and 7, the outer discs 250 may have at least one tab 254 that may be received in a recess 202 of the piston 38. As such, the outer discs 250 may be rotatable about the axis 180 with the piston 38. The inner discs 252 may have at least one tab 256 that may be received in a recess 240 of the drum 216. As such, the inner discs 252 may be rotatable about the axis 180 with the drum 216. The outer discs 250 and the inner discs 252 may be arranged in an alternating order in an axial direction or in a direction that extends along the axis 180. For instance, at least one inner disc 252 may be axially positioned between two adjacent outer discs 250 or vice versa. The piston 38 may be rotatable about the axis 180 with the drum 216 when the discs of the disc pack 218 are sufficiently compressed such that the outer discs 250 and the inner discs 252 do not slip with respect to each other. Conversely, the drum 216 may be rotatable with respect to the piston 38 when the discs of the disc pack 218 are not sufficiently compressed or when the outer discs 250 and the inner discs 252 slip with respect to each other.

Referring to FIGS. 4, 6 and 7, the first biasing member 220 may exert a biasing force on the disc pack 218. The first biasing member 220 may have any suitable configuration. For instance, the first biasing member 220 may be configured as a spring that may extend from the first bearing assembly 212 to the disc pack 218 and that may exert a biasing force on the disc pack 218 in a direction that may extend toward the yoke 34. As such, the first biasing member 220 may compress the discs of the disc pack 218.

The second biasing member 222 may selectively couple the shaft 210 and the drum 216. The second biasing member 222 may have any suitable configuration. For example, the second biasing member 222 may be configured as a wrap spring that may be axially positioned between the disc pack 218 and the second bearing assembly 214. The second biasing member 222 may be partially received inside the yoke 34 and may be partially received inside the piston 38. The second biasing member 222 may extend around the shaft 210 and may extend around a portion of the drum 216. The second biasing member 222 may be configured to slip and allow the shaft 210 to rotate with respect to the drum 216 and the piston 38 when the brake is released or braking is disengaged as will be discussed in more detail below.

Referring to FIG. 3, at least one retraction spring 42 may be provided to facilitate retraction of the brake pad assemblies 24. In the configuration shown, a pair of retraction springs 42 are provided. The retraction springs 42 may be received in the cavity 80 of the caliper housing 70 and may extend from the yoke 34 to the cover plate 86. The retraction springs 42 may be configured to actuate the yoke 34 away from the cover plate 86 since the cover plate 86 is fixed to the caliper housing 70. As such, the retraction springs 42 may urge the yoke 34 to move along the axis 180 in a direction that extends away from the brake rotor 60 and the cover plate 86.

Figure 8:
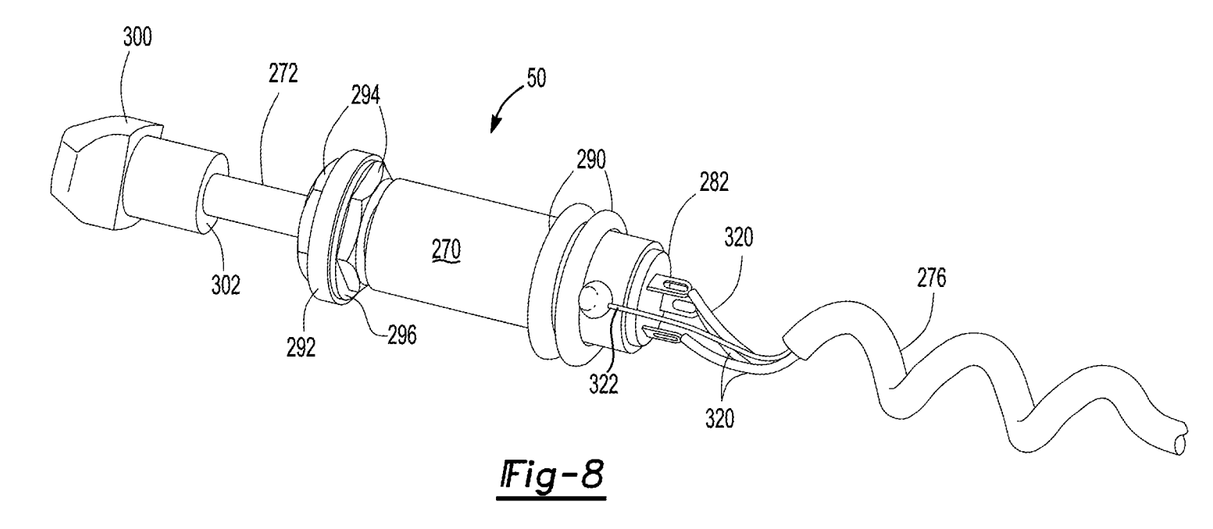
FIG. 8 is a perspective view of a sensor assembly.
Figure 9:
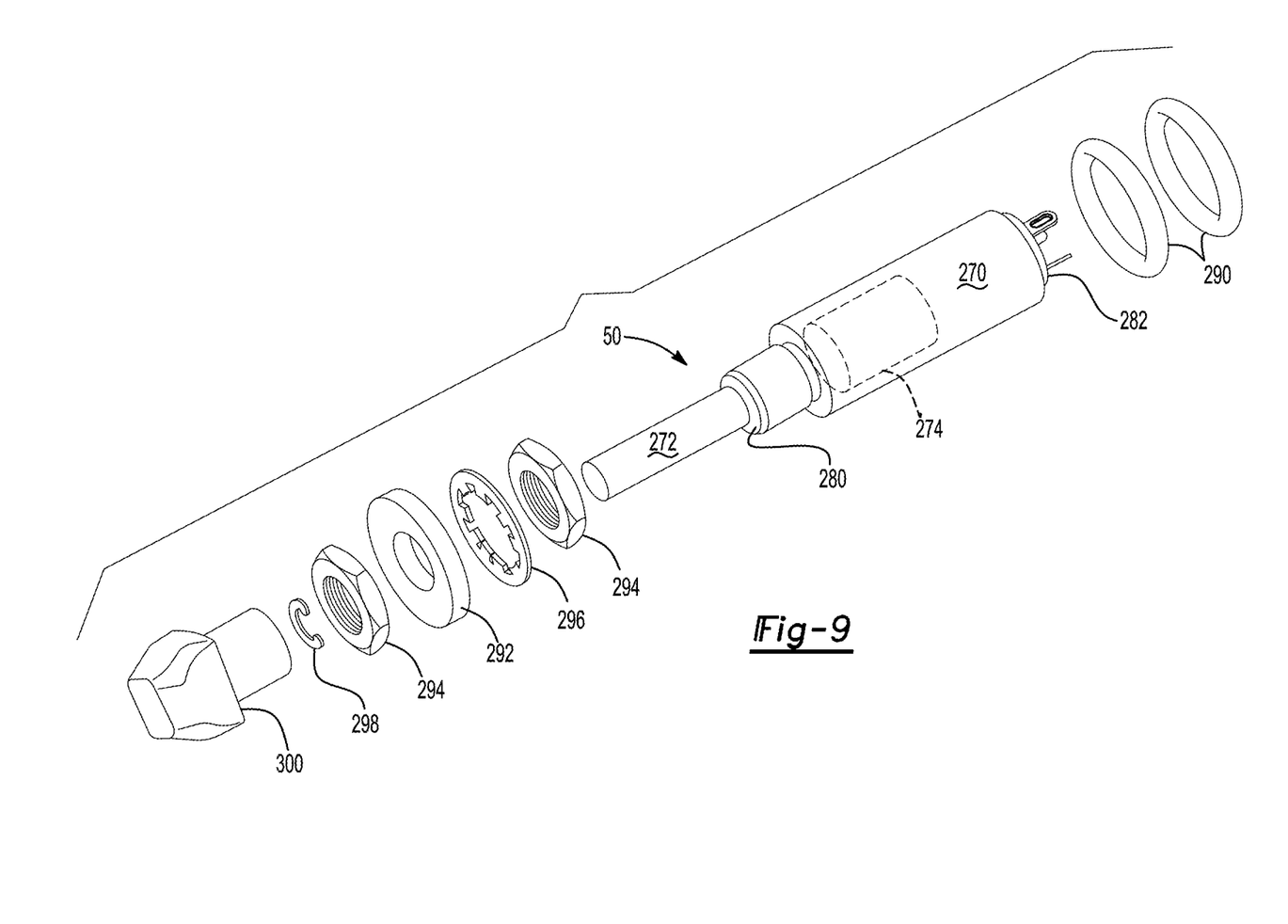
FIG. 9 is an exploded view of the sensor assembly.

Referring to FIGS. 4, 8 and 9, the sensor assembly 50 may be received inside the shaft 210. For example, at least a portion of the sensor assembly 50 may be received inside the shaft cavity 230. The sensor assembly 50 may provide a signal that may be indicative of rotation of the shaft 210 about the axis 180. In at least one configuration, the sensor assembly 50 may include a sensor housing 270, a sensor shaft 272, a sensor 274, and a cable 276.

The sensor housing 270 may be received inside the shaft cavity 230. In addition, the sensor housing 270 may be rotatable about the axis 180 with the shaft 210. The sensor housing 270 may contact the shaft 210 or may be spaced apart from the shaft 210. In the configuration shown, the sensor housing 270 is illustrated as being spaced apart from the shaft 210. The sensor housing 270 may have a first end 280 and a second end 282. The first end 280 may face toward the tappet 36. The second end 282 may be disposed opposite the first end 280 and may face toward the yoke 34. The sensor housing 270 may be mounted to the shaft 210 in any suitable manner. In the configuration shown, the sensor housing 270 is mounted to the shaft 210 with a plurality of flexible or resilient rings that may facilitate insertion and removal of the sensor assembly 50 with respect to the shaft cavity 230. For instance, one or more rings 290 that may be configured as O-rings may extend around an outside diameter of the sensor housing 270 and may extend from the sensor housing 270 to the shaft 210. Another ring 292 may be mounted on a smaller diameter portion of the sensor housing 270 from which the sensor shaft 272 may extend. For instance, the ring 292 may be received between a pair of fasteners 294, such as nuts, that may be threaded onto the smaller diameter portion of the sensor housing 270. Optionally, one or more washers 296 may be positioned between the ring 292 and a fastener 294. Optionally, a retainer 298 such as a snap ring may be coupled to the sensor housing 270 and may inhibit loosening of a fastener 294. The retainer 298 may be axially positioned near an end of the smaller diameter portion.

The sensor shaft 272 may extend from the sensor housing 270 toward the tappet 36. As such, the sensor shaft 272 may be at least partially received in the shaft cavity 230 and may be spaced apart from the shaft 210. The sensor shaft 272 may extend along the axis 180 and may be rotatable about the axis 180 with respect to the sensor housing 270. The sensor shaft 272 may be rotatable with the end cap 204 and thus may be rotatable about the axis 180 with the piston 38. For instance, the sensor shaft 272 may be coupled to the end cap 204 such that the sensor shaft 272 and the end cap 204 may be rotatable together about the axis 180. The sensor shaft 272 may be directly or indirectly coupled to the end cap 204. For instance, the sensor shaft 272 may be indirectly coupled to the end cap 204 with an adapter 300. The adapter 300 may extend from the sensor shaft 272 to the end cap 204. In at least one configuration, the adapter 300 may be received in the end cap hole 206 and may have an adapter opening 302 that may receive the sensor shaft 272 such that the sensor shaft 272 may not be rotatable about the axis 180 with respect to the adapter 300.

Referring to FIG. 9, the sensor 274 may be received inside the sensor housing 270 and may be coupled to the sensor housing 270. The sensor 274 may be of any suitable type. For instance, the sensor 274 may be configured as a potentiometer, encoder, hall effect sensor, optical sensor, or the like. The sensor 274 may detect rotation of the sensor shaft 272 about the axis 180 with respect to the sensor housing 270. Since the sensor housing 270 is not rotatable with respect to the shaft 210, the sensor 274 may therefore detect rotation of the shaft 210 with respect to the sensor shaft 272. As will be discussed in more detail below, rotation of the shaft 210 that may be detected by the sensor 274 may be indicative of rotation of the shaft 210 with respect to the piston 38. Alternatively or in addition, rotation of the shaft 210 that may be detected by the sensor 274 may be indicative of brake stroke or movement of the tappet 36 and the piston 38 along the axis 180 when the piston 38 does not rotate with respect to the tappet 36.

Referring to FIGS. 4 and 8, the cable 276 may extend from the sensor housing 270 in a direction that extends away from the tappet 36. The cable 276 may extend through a hole 84 in the caliper housing 70 to facilitate external access and to facilitate an electrical connection with another component, such as the controller 52. In at least one configuration, the cable 276 may extend through a plug 310 that may be received in the hole 84. The plug 310 may seal against the caliper housing 70 and may seal against the cable 276 to inhibit contaminants from entering the cavity 80 of the caliper housing 70. The cable 276 may be provided with a coiled configuration as shown or may be provided with a non-coiled configuration. In at least one configuration, the cable 276 may include one or more conductors 320 and a tether 322.

Referring to FIG. 8, a conductor 320 may be configured as a wire that may electrically connect the sensor 274 to an external component, such as the controller 52. In the configuration shown, three conductors 320 are provided; however, it is contemplated that a greater or lesser number of conductors may be provided depending on the type of sensor employed. Each conductor 320 may be coupled to a terminal that may be electrically connected to the sensor 274 and that may be disposed on the sensor housing 270. For instance, a terminal may be disposed proximate the second end 282 of the sensor housing 270.

The tether 322 may be mounted to the sensor housing 270. For instance, the tether 322 may be mounted to the sensor housing 270 between the first end 280 and the second end 282 of the sensor housing 270. The tether 322 may be configured to facilitate removal of the sensor assembly 50. For instance, the tether 322 may be configured with less slack than the conductors 320 such that pulling on the cable 276 may straighten the tether 322 and apply force on the sensor housing 270 via the tether 322 rather than via the conductors 320 to help pull the sensor assembly 50 out of the shaft cavity 230. As such, disconnection of the conductors 320 or damage to the sensor 274 may be avoided.

Referring to FIG. 4, the controller 52 may monitor and control operation of the brake assembly 10. For instance, the controller 52 may monitor and control operation of the brake actuator 30. The controller 52 may be of any suitable type, such as a multiprocessor-based controller. The controller 52 may also process signals or data from various input devices, such as the sensor assembly 50 and one or more input devices 330, such as a brake pedal sensor or another sensor that may trigger braking of the vehicle, such as an adaptive cruise control system or a proximity sensor that may detect an object or obstruction in front of the direction of travel of the vehicle. The controller 52 may also communicate with an operator communication device 332 that may provide information to a vehicle operator. The operator communication device 332 may be of any suitable type. For instance, the operator communication device 332 may produce an audible output, visual output, tactile output, or combinations thereof. Some examples of operator communication devices may include a display, light, other, speaker, haptic device, or combinations thereof.

Referring to FIG. 4, operation of the brake assembly 10 will now be described in more detail. As an overview, the brake assembly 10 may start in a retracted state in which braking of the vehicle is not requested. As such, the brake pad assemblies 24 may be retracted away from the brake rotor 60 and components of the brake assembly 10 may be positioned as shown. In response to a vehicle braking command, such as may be provided by an input device 330, the controller 52 may initiate braking of the vehicle. The controller 52 may operate the brake actuator 30 to extend the brake actuator shaft, thereby rotating the operating shaft 32 about its axis of rotation in a first direction or a counterclockwise direction from the perspective shown. Rotation of the operating shaft 32 may move the yoke 34, tappet 36, piston 38, wear adjuster mechanism 40, and the inboard brake pad assembly 24 that is disposed adjacent to the tappet 36 along the axis 180 toward the brake rotor 60 or to the left from the perspective shown. Movement of the yoke 34 toward the brake rotor 60 may compress the retraction springs 42. In addition, rotation of the operating shaft 32 may cause the ball pin 150 to engage the ball pin engagement feature 232 of the shaft 210, which may rotate the shaft 210 about the axis 180. Once the inboard brake pad assembly 24 contacts the brake rotor 60 a reaction force may then move the brake caliper 22 with respect to the brake carrier 20 to actuate the outboard brake pad assembly 24 that is disposed between the brake rotor 60 and the caliper bridge 72 into engagement with an opposite side of the brake rotor 60 to help slow rotation of the brake rotor 60 and an associated vehicle wheel. Retracting the brake actuator shaft may allow the operating shaft 32 to rotate about its axis of rotation in a clockwise direction from the perspective shown, which in turn may allow the actuation sequence to proceed in reverse under the biasing force of the retraction springs 42.

Rotation of the operating shaft 32 may or may not result in adjustment of the running clearance between the brake pad assembly 24 and the brake rotor 60. For example, rotation of the operating shaft 32 in the first direction may operate the wear adjuster mechanism 40 to extend the tappet 36 closer to the brake rotor 60 with respect to the piston 38 when the operating shaft 32 and the ball pin 150 rotate the shaft 210 about the axis 180 before the inboard brake pad assembly 24 contacts the brake rotor 60. As such, the shaft 210 and the drum 216 may rotate together about the axis 180 due to the force exerted by the second biasing member 222. Rotation of the drum 216 may cause the piston 38 to rotate about the axis 180 due to the coupling provided by the disc pack 218. Rotation of the piston 38 may extend the tappet 36 (i.e., extend the tappet 36 further away from the yoke 34 and closer to the brake rotor 60) due to the mating of the outer female thread 200 of the piston 38 and the inner female thread 190 of the tappet 36. For example, rotation of the piston 38 may cause the tappet 36 to extend due to operation of the mating threads since the tappet 36 is inhibited from rotating about the axis 180 by the brake carrier 20. An example of extension of the tappet 36 to reduce the running clearance is shown in FIG. 5. Extension of the tappet 36 with respect to the piston 38 may stop when the inboard brake pad assembly 24 contacts the brake rotor 60. For example, the torque required to rotate the piston 38 increases substantially when the inboard brake pad assembly 24 contacts the brake rotor 60 even when the brake actuator 30 continues to rotate the operating shaft 32 and hence continues to rotate the shaft 210. As a result, the discs of the disc pack 218 may slip with respect to each other, thereby permitting rotation of the shaft 210 with respect to the piston 38.

The wear adjuster mechanism 40 may operate to hold the tappet 36 in its adjusted position when the brake pad assemblies 24 are retracted. For example, when the brake actuator 30 is retracted the operating shaft 32 may rotate in a second direction that is disposed opposite the first direction, or clockwise from the perspective shown. The ball pin 150 may then rotate the shaft 210 in the opposite direction back to its previous rotational position. However, the force exerted by the disc pack 218 may exceed the force exerted by the second biasing member 222. As a result, the disc pack 218 may inhibit rotation of the piston 38 about the axis 180 with respect to the drum 216 while the second biasing member 222 may slip or allow the shaft 210 to rotate about the axis 180 in the second direction with respect to the drum 216 and back to its previous position.

Rotation of the operating shaft 32 may not result in adjustment of the running clearance between the brake pad assembly 24 and the brake rotor 60 when the inboard brake pad assembly 24 contacts the brake rotor 60 before the operating shaft 32 and the ball pin 150 rotate the shaft 210 about the axis 180. As previously discussed, the torque required to rotate the piston 38 increases substantially when the inboard brake pad assembly 24 contacts the brake rotor 60. As a result, the discs of the disc pack 218 may slip with respect to each other as the operating shaft 32 rotates in the first direction, thereby permitting rotation of the shaft 210 with respect to the piston 38 while rotation of the piston 38 is opposed by the tappet 36 reacting against the brake rotor 60. The wear adjuster mechanism 40 may operate to hold the tappet 36 in its current position when the brake pad assemblies 24 are retracted (e.g., the disc pack 218 may inhibit rotation of the piston 38 about the axis 180 while the second biasing member 222 may slip or allow the shaft 210 to rotate about the axis 180 and back to its previous position as previously described).

The sensor assembly 50 may allow operation of the brake assembly 10 to be monitored in various ways.

First, the signal from the sensor assembly 50 may allow the controller 52 to determine a cumulative amount of rotation of the shaft 210 about the axis 180 with respect to an initial rotational position of the shaft 210, such as an initial rotational position before the wear adjuster mechanism 40 adjusts the running clearance. As such, the controller 52 can monitor or determine the cumulative adjustment of the running clearance or extension of the tappet 36 since rotation of the shaft 210 is a prerequisite for rotation of the piston 38 and extension of the tappet 36. The cumulative amount of rotation of the shaft 210 with respect to the piston 38 may be indicative of the total amount of wear of the friction material 102 of the brake pad assembly 24. For instance, if the sensor 274 is configured as a potentiometer in which 10 detected revolutions correspond to a fully worn brake pad (i.e., 10 revolutions correspond to wear of the friction material 102 from an unworn condition to a fully worn condition) then an output may be provided by the controller 52 via the operator communication device 332 to provide information that a brake pad assembly 24 should be checked or replaced when 10 revolutions are detected.

Second, the signal from the sensor assembly 50 may allow the controller 52 to determine the brake stroke or actuation distance along the axis 180. For instance, actuating or extending the brake actuator 30 may cause the operating shaft 32 to rotate the shaft 210 about the axis 180 in a first rotational direction as previously described. The amount of rotation of the shaft 210 about the axis 180 may be proportional to approximately equal to the rotation of the operating shaft 32, notwithstanding a small amount of clearance or backlash that may be provided between the ball pin 150 and the ball pin engagement feature 232 of the shaft 210. As such, rotation of the shaft 210 may be approximately equal to the rotation of the operating shaft 32 notwithstanding the backlash error. Since rotation of the operating shaft 32 results in extension or retraction of the brake pad assemblies (i.e., brake stroke) the rotation of the shaft 210 detected by the sensor assembly 50 may be proportional to the brake stroke or may sufficiently approximate the brake stroke and thus may be indicative of brake stroke. As a result, the sensor assembly 50 may detect whether an incomplete brake stroke has occurred or whether the brake assembly is stuck in the actuated or applied position, the released position, or an intermediate position therebetween. Some examples that illustrate such detection are shown in FIGS. 10A through 10D. In these figures, rotation detected by the sensor assembly 50 or rotation of the shaft 210 in degrees is plotted along the vertical axis and time is plotted along the horizontal axis.

Figure 10A:
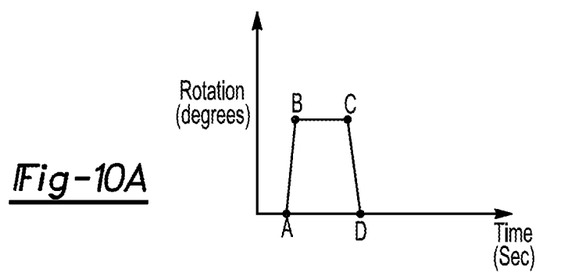
FIGS. 10A through 10D are examples of sensor assembly signal plots.

Referring to FIG. 10A, a sensor signal plot is shown that may be representative of expected brake stroke during braking when there is no adjustment to the running clearance. Brake application occurs from point A to point B. The shaft 210 may rotate about the axis 180 in a first direction from point A to point B and the tappet 36 and piston 38 may move together along the axis 180 toward the brake rotor 60 from point A to point B. Continued application of the brake with the brake pad assemblies in contact with the brake rotor 60 occurs from point B to point C. As such, the shaft 210 may not rotate about axis 180 from point B to point C. Brake release or movement back to the retracted position occurs from point C to point D. The shaft 210 may rotate about the axis 180 in a second direction from point C to point D and the tappet 36 and piston 38 may move together along the axis 180 away from the brake rotor 60 in a second axial direction from point C to point D. The distance from point A to point B should be the same or approximately the same as the distance from point C to point D, thereby indicating that the brake assembly 10 has moved from the retracted position to the applied position and back to the retracted position again. Thus, the brake assembly may be operating as expected when rotation of the shaft 210 in the first direction (from point A to point B) is sufficiently close to rotation of the shaft 210 in the second direction (from point C to point D). Sufficient closeness of rotation in the first and second directions may be assessed by comparing the magnitude of the rotation in the first direction to magnitude of the rotation in the second direction. For example, expected movement of the brake assembly 10 (i.e., expected engagement and disengagement such as when the brake pad assembly 24 has properly engaged and/or disengaged the brake rotor 60) may be present when rotation of the shaft 210 in the first direction is within a threshold amount of rotation of the shaft 210 in the second direction. The threshold amount may be based on design requirements or vehicle development testing and may account for design tolerances or sensitivity of the sensor 274. As a nonlimiting example, the threshold amount may be ±2°.

Expected movement may not be present when rotation of the shaft 210 in the first direction is not within a threshold amount of rotation of the shaft 210 in the second direction. Some associated examples are shown in FIGS. 10B through 10D.

Figure 10B:
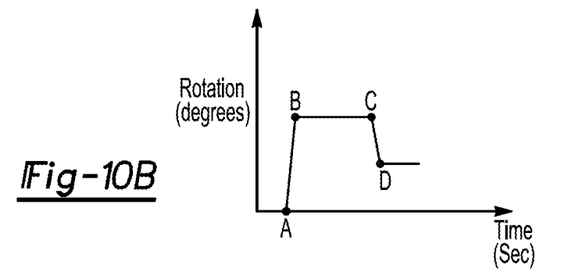

Referring to FIG. 10B, a sensor signal plot is shown that may be representative of improper retraction of the brake assembly 10. The distance from point A to point B is greater than the distance from point C to point D by more than the threshold amount. This may indicate that the brake assembly 10 has not moved from the applied position back to the retracted position since the sensor assembly 50 has not detected rotation of the shaft 210 back to its initial rotational position at point A or rotation back to a point within a threshold amount of point A.

Figure 10C:
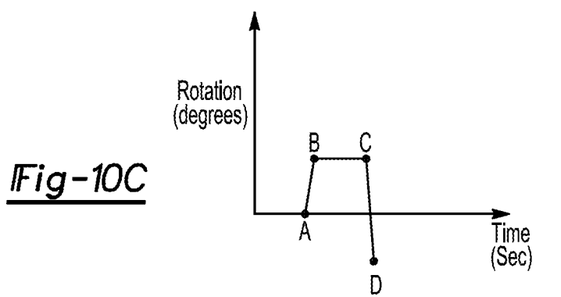

Referring to FIG. 10C, another sensor signal plot is shown that may be representative of improper movement of the brake assembly 10. The distance from point A to point B is less than the distance from point C to point D by more than the threshold amount. This may indicate that the brake assembly 10 was not initially in the retracted position at point A.

Figure 10D:
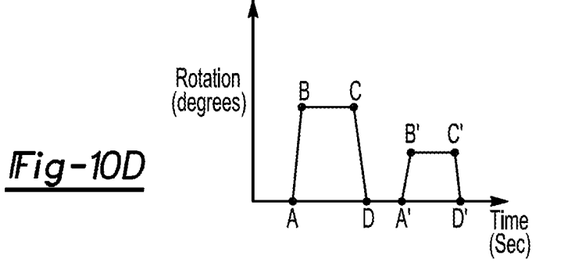

Referring to FIG. 10D, another sensor signal plot is shown that may be representative of improper movement of the brake assembly 10. Points A through D are the same as those shown in FIG. 10A and are representative of expected movement from the retracted position to the applied position and back to the retracted position. No braking is requested or applied from point D to point A'. Points A' through D' represent a subsequent brake request and associated movement of the brake assembly. The distance from point A' to point B' is much less than the distance from point A' to point B' or less by more than the threshold amount. Similarly, the distance from point C' to point D' is much less than the distance from point C to point D or less by more than the threshold amount. This may indicate that the brake assembly 10 did not fully move from the retracted position at point A' to the applied position at point B' but that the retraction back to the retracted position (from point C' to point D') was as expected.

Third, the signal from the sensor assembly 50 may allow the controller 52 to determine whether a wear adjuster mechanism instability condition exists. The shaft 210 of the wear adjuster mechanism 40 should not rotate or should rotate by a very small amount when braking is not applied or braking does not occur (e.g., the running clearance should not be adjusted when brake application does not occur or when there is no movement to the applied position). As such, the detected rotation of the shaft 210 when braking is not applied should be zero or near zero. As such, the controller 52 may compare the signal, which is indicative of rotation of the shaft 210, to a predetermined range. The wear adjuster mechanism 40 may be stable and may be operating as expected when the signal is within the predetermined range when braking does not occur (i.e., there is little or no rotation of the shaft 210, which is expected when there is no braking). The wear adjuster mechanism 40 may be unstable (i.e., a wear adjuster mechanism instability condition may exist) when the signal is not within the predetermined range (i.e., rotation of the shaft 210 is outside the predetermined range or greater than expected, which is not expected since little to no rotation should be detected when there is no braking). The predetermined range may be based on design requirements or vehicle development testing and may account for design tolerances or sensitivity of the sensor 274. As a nonlimiting example, the predetermined range may be ±2°.

The brake assembly as previously discussed may allow a sensor assembly to be provided inside of a wear adjustment mechanism and may not require additional package space. In addition, the sensor assembly may facilitate detection of friction material wear as well as brake stroke, thereby eliminating the need for separate sensors to detect these attributes. The sensor assembly may be removed or replaced without disassembling the wear adjuster mechanism, which may reduce downtime and maintenance costs. In addition, the signal from the sensor assembly may be used to detect and monitor performance of the brake assembly and to determine whether a brake malfunction may have occurred.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake assembly comprising:
    a brake caliper;
    a tappet that is moveable along an axis with respect to the brake caliper and that is adapted to engage a brake pad assembly;
    a piston that is rotatable about the axis and is at least partially received in the tappet, wherein the piston and tappet have mating threads;
    a wear adjuster mechanism that is at least partially received inside the piston, wherein the wear adjuster mechanism includes a shaft that is rotatable about the axis; and
    a sensor assembly that is received inside the shaft and that provides a signal indicative of rotation of the shaft.

2. The brake assembly of claim 1 wherein the shaft has a shaft cavity extends along the axis from a first end of the shaft to a second end of the shaft and the sensor assembly is received inside the shaft cavity.

3. The brake assembly of claim 2 wherein the sensor assembly includes a sensor housing that is received inside the shaft cavity and that is rotatable about the axis with the shaft.

4. The brake assembly of claim 3 wherein the sensor housing is spaced apart from the shaft.

5. The brake assembly of claim 3 wherein an end cap is fixedly mounted to the piston, and the sensor assembly has a sensor that is received in the sensor housing and a sensor shaft that extends from the sensor housing and that is rotatable with the end cap and the piston, wherein the sensor detects rotation of the sensor shaft about the axis with respect to the sensor housing.

6. The brake assembly of claim 5 wherein the sensor shaft extends along the axis and is spaced apart from the shaft.

7. The brake assembly of claim 5 wherein the end cap has an end cap hole that receives an adapter that couples the sensor shaft to the end cap.

8. The brake assembly of claim 7 wherein the adapter has an adapter opening that receives the sensor shaft.

9. The brake assembly of claim 1 wherein the sensor assembly includes a cable that extends away from the tappet and through a hole in the brake caliper.

10. The brake assembly of claim 9 wherein a plug is received in the hole in the brake caliper and the cable extends through the plug.

11. The brake assembly of claim 9 wherein the sensor assembly includes a sensor that is received in a sensor housing and the cable includes a conductor that is electrically connected to the sensor and a tether that is coupled to the sensor housing.

12. The brake assembly of claim 11 wherein the sensor housing has a first end that faces toward the tappet and a second end that is disposed opposite the first end, wherein the conductor is disposed proximate the second end and the tether is mounted to the sensor housing between the first end and the second end.

13. The brake assembly of claim 1 wherein rotation of the shaft is indicative of rotation of the shaft with respect to the piston.

14. The brake assembly of claim 1 wherein rotation of the shaft is indicative of movement of the tappet and the piston along the axis when the piston does not rotate with respect to the tappet.

15. A brake assembly comprising:
    a brake caliper;
    a tappet that is moveable along an axis with respect to the brake caliper and that engages a brake pad assembly;
    a piston that is moveable along the axis, rotatable about the axis, and is at least partially received in the tappet, wherein the piston and tappet have mating threads;
    a wear adjuster mechanism that is at least partially received inside the piston, wherein the wear adjuster mechanism has a shaft that defines a shaft cavity and that is rotatable about the axis;
    a sensor assembly that is received inside the shaft cavity and that provides a signal that is indicative of rotation of the shaft; and
    a controller that receives the signal and that provides an output based on the signal.

16. The brake assembly of claim 15 wherein the controller determines a cumulative amount of rotation of the shaft about the axis with respect to the piston based on the signal.

17. The brake assembly of claim 15 wherein the controller determines rotation of the shaft about the axis in a first direction based on the signal when the tappet is actuated in a first axial direction to actuate the brake pad assembly into engagement with a brake rotor, and determines rotation of the shaft about the axis in a second direction based on the signal when the tappet is actuated in a second axial direction that is opposite the first axial direction to disengage the brake pad assembly from the brake rotor.

18. The brake assembly of claim 17 wherein the brake pad assembly has properly engaged and disengaged the brake rotor when the rotation of the shaft in the first direction is within a threshold amount of the rotation of the shaft in the second direction.

19. The brake assembly of claim 17 wherein the brake pad assembly has not properly engaged or disengaged the brake rotor when the rotation of the shaft in the first direction is not within a threshold amount of the rotation of the shaft in the second direction.

20. The brake assembly of claim 15 wherein the controller determines that a wear adjuster mechanism instability condition exists based on the signal when braking is not applied and when rotation of the shaft is not within a predetermined range.

\* \* \* \* \*